2,987,495
COMPOSITION COMPRISING REACTION PRODUCT OF PHENOLIC MATERIAL AND BUTADIENE-FURFURAL CONDENSATE
Mortimer T. Harvey, South Orange, and Peter L. Rosamilia, Newark, N.J., assignors to Harvel Research Corporation, Irvington, N.J., a corporation of New Jersey
No Drawing. Filed Dec. 15, 1958, Ser. No. 780,219
6 Claims. (Cl. 260—38)

This invention relates to novel compositions of matter and to methods for producing them. In one of its more specific aspects the invention is directed to novel derivatives of materials (II) butadiene-furfural organic reaction products having softening point (ball and ring) no greater than 180° F. either alone or in combination with other materials. Throughout the present description and claims the term "butadiene" is and shall mean the compound butadiene-1,3. In one of its other, and possibly more important aspects, the invention is directed to friction elements containing such novel derivatives as components thereof.

Prior to this invention, butadiene was reacted with furfural under varying conditions to provide a wide variety of compositions, all of which contained material (II).

Among some of said materials (II) which may be employed as staring materials in the practice of this invention are (IIA) substantially pure 2,3,4,5-bis ($\Delta^2$-butenylene)-tetrahydrofurfural, as well as homopolymers thereof, and other compositions in which said compound and/or its polymers is present as a component in varying degrees of concentration and together with other organic compounds produced with furfural and/or butadiene under the particular reaction conditions employed.

Other materials (II) which may be employed in the practice of this invention are those disclosed in a number of issued patents known to the art and made part hereof. Among them are (IIB) light colored, liquid organic reaction products of furfural and butadiene having an average molecular weight of about 210, fractions thereof having boiling points in the temperature range of 200–320° F. at an absolute pressure of 1 mm. of mercury pressure. Such reaction products and methods for producing them are disclosed in the U.S. patent to Herbolsheimer, 2,483,903, issued on October 4, 1945.

Still other examples of such materials (II) are (IIC) the tarry by-products or residues containing butadiene-furfural organic reaction products and obtained by Herbolsheimer in practicing the method disclosed in said patent.

Still other examples of said materials (II) are (IID) the dark colored tarry residues obtained in the reaction fufural and butadiene and varying in consistency from practically solid, semi-solid to fairly fluid light colored liquid masses. Such masses are composed chiefly of complex mixtures of reaction products of butadiene and furfural in various molecular proportions generally 1:1 and/or 2:1 and with a substantial part being in polymeric form, and also (IID) which either under atmospheric pressure or subatmospheric pressure, which may be as low as 5 mm. of mercury pressure and generally 5–125 mm. of mercury pressure, is heated to and maintained at a temperature in the range of 250° F.–450° F. either in the presence or absence of an alkaline or acidic catalyst until the quantity by weight thereof measures at least 60% of that of the orginal mass of (IID) and the average molecular weight thereof is at least 660 and its viscosity at 25° C. is such that a solution of 5 parts thereof in 10 parts of furfural is at least twice that of a solution consisting of 5 parts (IID) in 10 parts of furfural and has a softening point (ball and ring) no greater than 180° F. Such end products are known herein as (IIE) and in general may be characterized as homopolymerized (IID).

Still other examples of materials (II) and (IIF), the dark colored tarry residues which may vary in consistency from dark practically solid, semi-solid to fairly fluid lighter colored liquid masses which are complex mixtures of reaction products of butadiene and furfural and are by-products formed during the extractive distillation of a $C_4$ hydrocarbon mixture containing butadiene, employing furfural as the selective solvent and are generally known to the art as plant residues formed in the furfural extractive distillation method for the purification of butadiene. (A report on such residues, which the authors term "polymeric residue formed in the fufural extractive distillation method for the purification of butadiene," appears in an article entitled "Butadiene-Furfural Copolymers," by Hillyer et al., Ind. and Eng. Chem., vol. 40, November, 1948, pp. 2216–2220, reference to which is hereby made.)

Still other examples of materials (II) are (IIG) which are the materials produced by homopolymerizing (IIF) using the same methods as those set forth for the homopolymerization of (IID) to obtain (IIE).

The materials (II) preferably employed in the practice of this invention are (IIC)–(IIG) some of which are liquid and others solid at 70° F. but all of which have average molecular weight of at least 330, viscosity at 25° C. of at least 2,000 cp., are soluble in furfural, and have a softening point (ball and ring) of at least 60° F. and no greater than 180° F.

In general, the amount of alkaline agent employed in order to effect the homopolymerization is such that it is sufficient to increase the pH of the mass to be polymerized to a value of at least 8, but may be as high as desired, depending upon the speed of reaction required. In factory practice, we prefer to carry out said polymerization at a pH in the range of approximately 8 to approximately 12 although higher pH conditions, as high as 13.5 may be employed. (The method for measuring pH wherever it occurs throughout the present description is to place 10 grams of the materials whose pH is to be determined in 100 grams of distilled water, heat the mixture to boiling while stirring, allow to cool to room temperature and take the pH by means of pH papers.) The pH papers employed were those known as "Hydrion." Said pH conditions in the range of approximately 8–13.5 are established at the beginning and reduced in the course of polymerization. Among some of the alkaline agents which may be employed in the practice of this invention are sodium hydroxide, potassium hydroxide, calcium hydroxide, etc., diethylene triamine, triethylene tetramine, ethanolamine, propylene diamine, 1,6-hexamethylene diamine, tetraethylene pentamine, etc.

When acidic agent is employed for homopolymerization, there is used an acidic agent in amount equal to the acidic polymerizable equivalent of at least one part by weight of sulfuric acid for each 200 parts of the materials (II) to be polymerized. The quantity and nature of the acidic agent employed is such that the pH of a mixture of the acidic agent and material (II) to be polymerized is lowered to a value no greater than approximately 3.5, but may be as low as desired, depending upon the speed of reaction required. In factory practice, said polymerization is carried out at a pH in the range of 1.5 to approximately 3.5. Among some of the acidic agents which may be employed for effecting said polymerization are sulfuric acid, hydrochloric acid, phosphoric acid, fluoroboric acid, boron trifluoride, paratoluene sulfonic acid, alkyl sulfates such as the mono- and di-alkyl sulfates, mono- or dimethyl, ethyl, propyl, etc. sulfates, phosphates, etc.

While various methods for producing materials (II) may be employed, we shall set forth herein a number of illustrative examples which shall be sufficient for illustrating said materials (II) which are employed as starting materials in the practice of this invention. The following Examples A–H are given by way of illustration and not limitation of such materials (II) and methods for producing them, all parts being given by weight unless otherwise specified.

*Example A*

There is collected and obtained a batch of what is termed, the "polymeric residue formed in the furfural extractive distillation method for the purification of butadiene." This raw plant residue which is a waste product or a by-product, generally is physically combined with water and therefore the batch is first placed in an oven and maintained at elevated temperature for about 15 hours for substantially complete dehydration and the resultant substantially dehydrated mass is hereinafter known as material IIK–A. The dehydration may be effected at atmospheric pressure and at temperatures of approximately 200–220° F.

*Example B*

If desired, said original raw residue of Example A may be heated under either atmospheric or reduced pressure conditions to substantially completely dehydrate the mass at temperatures in the range of about 200–450° F. When the higher temperatures in said range are employed, furfural-butadiene reaction products come off as a distillate and are collected and are hereinafter known as materials IIK–B, leaving behind residual mass which is substantially completely dehydrated and having had said fraction removed at least in part therefrom, with said residual mass measuring at least 60% by weight of said dehydrated residue. Such dehydrated residual masses are also obtainable from said raw residue when said residue is maintained at the higher temperature of said range while under subatmospheric pressure of 5–125 mm. of mercury pressure. Said dehydrated residues, as well as said distillants and the residual masses of said residues in all cases have a molecular weight of at least 330, a viscosity of at least 2,000 cp. at 25° C., a softening point (ball and ring) of at least 60° F. and no greater than 180° F. and are soluble in furfural.

*Example C*

Into an oven maintained at 260–280° F. was placed a steel drum containing 485 lbs. of raw plant residue, being a residue obtained as a by-product in the purification of butadiene in which the furfural extractive distillation method was employed. Said residue is allowed to stand in that oven for a period of about 15–18 hours whereupon the residue was substantially completely dehydrated and somewhat higher volatiles originally contained therein had been driven off. At the end of that period, the mass in the container was still fluid at room temperature and is hereinafter known as material IIK–C.

*Example D*

Into a closed vessel is charged 500 lbs. of raw plant residue being that obtained as a by-product in the purification of butadiene in which the furfural extractive distillation method was employed. While under a vacuum of about 28" of mercury, the temperature of the raw residue is elevated slowly over about 1 hour period until it reached 215° F. and then the source of heat was removed and vacuum broken. The resultant dehydrated mass is thick, but pourable at room temperature and is hereinafter known as material IIK–D. In the course of heating said raw residue under such subatmospheric conditions, a distillate was recovered and consisted mainly of water with a small amount of light volatiles. If desired, while under the same degree of vacuum, the mass may be further heated and maintained at a temperature of 325–350° F. whereupon more volatiles come off and the remainder is so thick or polymerized that a sample thereof when cooled to room temperature had a softening point (ball and ring) of 130–180° F. depending upon the time of heating, and such product is known as material IIK–DI.

*Example E*

800 lbs. of raw plant residue was another illustrative raw material used. The raw residue was the water-laden residue obtained as a by-product or waste product in the purification of butadiene in which the furfural extractive distillation method was employed. This particular residue was quite heavy and a layer of water had separated out and floated on top of the residue. Most of the water layer was dipped off. Then to the residue which still contained an appreciable quantity of water, was transferred to a kettle, where was added an aqueous solution consisting of 8 lbs. of sodium hydroxide in 8 lbs. of water and the mass was agitated to distribute the sodium hydroxide throughout the residue. Then the mass was heated to a temperature of approximately 320–340° F. and maintained at that temperature while under subatmospheric conditions and a pressure of approximately 5–125 mm. of mercury pressure to substantially completely dehydrate the residue and to polymerize it to a softening point (ball and ring) of 165° F. This polymerized product so produced is solid at room temperature, but at 180° F. is liquid, that is, it will flow and such polymerized product is hereinafter known as material IIK–E.

*Example F*

Into an oven maintained at 260–280° F. was placed a steel drum containing 485 lbs. of raw plant residue being a residue obtained as a by-product in the purification of butadiene in which the furfural extractive distillation method was employed. Said residue is allowed to stand in that oven at that temperature for a period of about 15–18 hours whereupon said residue was completely dehydrated and some of the higher volatiles originally contained therein had been driven off. At the end of that period the mass in the container was a dark, thick, yet fluid mass. This product is hereinafter known as material IIK–F. The entire mass may be transferred to a closed kettle, vented to the atmosphere through which distillates may pass and be collected, and heated to approximately 425° F. and maintained at that temperature for approximately 2 to 5 hours. Then the source of heat may be removed and the resultant mass poured into pans and allowed to cool to room temperature. At this temperature the mass will be a thermoplastic solid, insoluble in hot and cold V.M.P. naphtha and will have a softening point (ball and ring) of 170° F. and consists chiefly of a highly polymerized reaction mass. This product is hereinafter known as material IIK–FI. All distillates are collected and combined and then dehydrated at 220° F. while under 28" vacuum. The dehydrated combined distillates are known as material IIK–F2. To the combined distillates either dehydrated or not and preferably the dehydrated mass has added thereto a solution consisting of 33 parts by weight of potassium hydroxide in 66 parts by weight of water. The quantity of said solution added is equal to 10 parts thereof to 100 parts of said distillate on a dry basis. The mass is mixed together and heated up to and maintained at 300° F. while being stirred and under such conditions after 13–14 hours is polymerized to such a degree that when cooled to room temperature it is a thermoplastic solid having a softening point (ball and ring) of approximately 180° F. and this product is known hereinafter as material IIK–F3.

To 100 lbs. of material IIK–F were mixed 6 lbs. of an aqueous solution consisting of 2 lbs. of sodium hydroxide in 4 lbs. of water. The mix was heated to and maintained at approximately 300° F. under atmospheric conditions until a solution of a 10-gram sample thereof at 25° C. dissolved in 5 grams of furfural had a viscosity at 25° C. about 4 times that of a solution of a 10-gram sample of the original material IIK–F dissolved in 5 grams of furfural. At this stage the mass is quickly cooled and there is added thereto an agent to neutralize the alkaline catalyst, if desired, and the polymerized product is hereinafter known as materail IIK–F4.

Example G

To the combined distillates material IIK–F2, either dehydrated or not and preferably in dehydrated condition, may be added about 10 parts of a 45% aqueous solution of fluoboric acid for each 100 parts of said dehydrated distillate. The mass is mixed together and maintained at 350° F. and under such conditions, until the viscosity of the mass at 25° C. was 20,000 cp. and this product is known hereinafter as material IIK–G.

To 100 lbs. of material IIK–F were mixed 15 lbs. of concentrated aqueous hydrochloric acid. The mix was heated to and maintained at approximately 290° F. until a solution of a 10-gram sample thereof at 25° C. dissolved in 5 grams of furfural had a viscosity at 25° C. about 2 times that of a solution of a 10-gram sample of the original material IIK–F dissolved in 5 grams of furfural. At this stage the mass is quickly cooled and there is added thereto an agent to neutralize the acidic catalyst and the polymerized product is hereinafter known as material IIK–G1.

Example H

Into a closed vessel is charged approximately 500 lbs. of raw plant residue, being that obtained as a by-product in the purification of butadiene in which the furfural extractive distillation method is employed. While under a vacuum of about 28″ of mercury, the temperature of the raw residue is elevated slowly over about 1 hour period until it reaches approximately 215° F., then the source of heat is removed and the vacuum is broken. The resultant mass weighs approximately 375 lbs., is thick but pourable, has a molecular weight above 330, a viscosity about 2,000 cp. at 25° C. and is soluble in furfural and has a softening point (ball and ring) above 60° F. The material which distilled over during the course of that heat treatment under vacuum was collected and consisted mainly of water together with a small amount of light volatiles. This product, said 375 lbs. mass, is hereinafter known as material IIK–H.

If desired, while under the same degree of vacuum, the mass may be further heated and maintained at a temperature of 325–350° F. whereupon more distillate comes off, the distillate collected and the remainder is so thickened or polymerized that a sample thereof when cooled to room temperature has a softening point (ball and ring) of 130–180° F. At that stage the mass is cooled to room temperature and will be found to be a thermoplastic and substantially solid resinous mass soluble in furfural and hereinafter known as material IIK–H1. The distillates were combined and are known as material IIK–H2.

To 100 parts of said material IIK–H2 calculated on a dry basis and being either in combination with the water or dehydrated, was added 8 parts of diethyl sulphate. The mix was heated to and maintained at 280° F. until a sample thereof had a viscosity at 25° C. approximately 10 times that of the original material IIK–H2 in dehydrated state, and this thickened or polymerized product is hereinafter known as material IIK–H3, is soluble in furfural and is in the liquid state.

To 100 lbs. of product IIK–H is added 2 lbs. of an aqueous solution consisting of 1 lb. of sulfuric acid in an equal quantity of water. The mix is heated to and maintained at 325° F. until the viscosity at 25° C. of a solution of a 10-gram sample thereof in 5 grams of furfural is two times that of a solution of a 10-gram sample of the original material 11K–H in 5 grams of furfural. Then the acidic agent is neutralized and cooled to room temperature. The so-thickened or polymerized mass is soluble in furfural and is liquid at 180° F. and is known as material IIK–H4.

All of said various materials (II) may be reacted with an aldehyde, such as formaldehyde or any of its available polymers to provide material (II–a1) which is still another class of materials (II) which may be used in the practice of this invention. In general, said materials (II) may be reacted with such aldehyde and the reaction is, in general, effected in the presence of a catalyst, which may be either acidic or alkaline, to promote the reaction to provide materials (II–a1) which are liquid at a temperature no greater than 250° F. and are soluble in a solvent consisting of 50% butanol and 50% xylene.

The following are specific examples of some of such materials (II–a1), given by way of illustration and not limitation, all parts being given by weight unless otherwise specified:

Example I 600 parts of material II–K–A (2 mols), 271 parts of a 47% methanol solution of formaldehyde (4.2 mols) and 40 parts of a 50% aqueous solution of sodium hydroxide were mixed together in a reaction vessel equipped with a stirrer and reflux condenser. While being constantly stirred, the mass was heated to and maintained at a temperature of 60° C. for 3 hours and then at 80° C. for 8 hours when the formaldehyde content was ascertained and was found to have dropped 26% indicating that 1.24 mols of formaldehyde had reacted. Then the reaction mass was, while under reduced pressure of 20 mm. of mercury pressure, maintained at 110° C. until all of the volatiles had been removed leaving behind a formaldehyde-free material hereinafter known as product (II–I–a1) which at room temperature is a thick liquid.

Example J 600 parts (1.4 mols) of material IIK–A, 271 parts of a 47% methanol solution of formaldehyde (4.2 mols) and 17.4 parts of paratoluene-sulfonic acid were mixed together in a reaction vessel. While being constantly stirred, said mixture was heated to 80° C. and maintained at that temperature for 10 hours. At the end of that period, the formaldehyde content of the mixture was measured and was found to be reduced by 22.4% indicating that 0.95 mols of formaldehyde had been reacted. The reaction mass was then subjected to reduced pressure conditions of 20 mm. of mercury pressure while maintained at a temperature of 110° C. until all of the volatiles had been removed, leaving behind a reaction mass which at room temperature is a thick fluid hereinafter known as product II–J–a1. Its viscosity was measured on a fluid-meter set at 130° F. and found to be 13.5 cms. in one minute.

In the course of our experimentation with materials (II), some examples of which are of the specific materials (II) and (II–a1) of the foregoing examples, we have discovered that in the absence or presence of acidic or alkaline condensing agent, they may be reacted with materials (I) which are (a) aldehyde-reactive phenols and (b) phenolaldehyde reaction products which are liquid at 250° F. The aldehyde reactive phenols are phenols which are capable of reacting with an aldehyde such as formaldehyde and generally may be classed as hydroxy benzene, hydroxy naphthenes, hydroxy anthracenes and their homologues, specific examples of which are hydroxy benzene, cresols, xylenols, monomeric and polymeric cashew nut shell liquid, monomeric and polymeric cardol, monomeric and polymeric cardanol, resorcinol, catechol, hydroquinone, alpha and beta naphthols, alpha and beta anthrols and anthranol, etc. and monomeric and polymeric residues of cashew nut shell liquid, said residues obtained in the manner well known to the art by the heat distillation of cashew nut shell liquid under either atmospheric or subatmospheric conditions to provide residues measuring at least 25% by weight of said cashew nut shell liquid, etc.

All of said materials (II), examples of which are material (IIA) and the other specific materials (II) identified in Examples A–J are soluble in furfural, a solvent consisting of 50% butanol and 50% xylene and have a softening point (ball and ring) no greater than 180° F. The novel products produced by reacting said materials (I) with said materials (II) have greater fungicidal characteristics than do materials (II) alone and such reaction products may be used as components in paints which may be employed as coating materials for inhibiting fungus growth and such reaction products themselves may be used as impregnants and coating compositions for canvas to prevent mildew thereon. They may be used as a component in electrical varnishes. They may serve as intermediates and may be reacted with various compounds for the production of their ethers and esters at the phenolic hydroxy of such reaction products. They impart greater ozone resistance than do materials (II) themselves to natural and synthetic rubbers. These novel compounds, some of which may be in the liquid form, may be further thickened to obtain polymers of various viscosities. They may be reacted with the aldehydes to produce reaction products which are unusual thus to provide a class of materials serving a purpose which is not obtainable by materials (II) themselves. Such aldehyde reaction products find application in the field of molded compounds, insecticides, etc. While materials (II) are useful in the rubber field, such reaction products of materials (II) and (I) which are later reacted with an aldehyde find application in a part of the rubber field where materials (II) themselves fall short. For instance, where hardness is desired and a substantial quantity of resin is to be added to natural or synthetic rubber, such materials (I) and (II) aldehyde reaction products will speed up the cure of Buna-N, where using material (II) alone slows down the cure.

In general, the reaction between materials (I) and (II) is preferably carried out in the presence of a coupling agent. The coupling agents which are employed for this reaction are acidic catalyst or katenoid agents, examples of which are diethyl sulfate, paratoluenesulfonic acid, sulfuric acid, phosphoric acid, oxalic acid, anhydrous hydrochloric acid, boron trifluoride, fluoboric acid, zinc chloride, aluminum chloride, etc. or alkaline agents such as sodium acetate, potassium carbonate, etc. In general, the reaction is carried out by mixing together one mole of material (I) and 1–3 moles of material (II). The amount of catalyst employed varies, but in general is between 0.5–20% of the total weights of reactants and depends upon the particular catalyst employed and the speed of reaction desired. For example, when aluminum chloride is employed, it may be as high as 20%, but when sulfuric acid is employed, in general about 5% is satisfactory.

The following examples are given by way of illustrating certain of the methods which may be employed and novel products which may be produced in accordance with this invention. These examples all being given by way of illustration and not limitation, all parts being given by weight unless otherwise specified.

*Example 1*

95 grams of hydroxy benzene, material (I), and 250 grams of 2,3,4,5-bis (Δ²-butenylene)-tetrahydrofurfural, material (IIA), are placed in a glass flask and heated to a temperature approximately 50° C. while maintained at the same temperature, 5 grams of a boron trifluoride-ether solution (50% solution) are carefully added with stirring to said mass and while being constantly stirred, the temperature of said mass is increased to approximately 75° C. and maintained at this temperature for reaction for approximately one hour. Then, the resultant mass is heated to 100° C. while under vacuum for a period of approximately 60 minutes to obtain an organic reaction product of (I) and (II) which is liquid at 25° C. and is hereinafter known as product 1.

*Example 2*

300 grams of cardanol, material (I), and 300 grams of material (IIK–A) and 5 grams of diethyl sulfate were mixed together and the mixture was heated to 150° C. and maintained at that temperature for a period of approximately 1 hour. At the end of that time the source of heat was removed and the temperature of the mass was reduced to room temperature and was found to be thick, yet pourable and consisting essentially of organic reaction of (I) and (II) and is hereinafter known as product 2.

*Example 3*

120 grams of resorcinol, material (I), and 600 grams of material (IIK–E) having average molecular weight of approximately 600 were warmed together and then there was added thereto 20 grams of a 50% alcoholic solution of sulfuric acid. This mass, while being constantly stirred, was continuously heated until the mass at 100° C. was a viscuous mass. Then the mass was placed in an oven at 150° C. and maintained therein for a period of approximately 24 hours. At the end of that period the mass was removed therefrom and was found to have been converted from a thermoflowing mass to a thermoset one. This thermoset mass was cooled to room temperature and then comminuted to 40 mesh and such product consisted essentially of organic reaction product of materials (I) and (II) in the thermoset condition and is hereinafter known as product 3, which is ground into a fine powder to be used in friction augmenting material in brake lining and clutch facings.

*Example 4*

300 parts of treated cashew nut shell liquid having a viscosity of 600 cp. at 25° C., material (I) and 400 parts of material (IIK–DI) having an average molecular weight of approximately 800 were mixed together and into said mixture was slowly bubbled dry hydrochloric acid while being constantly stirred whereupon an exothermic reaction occurred and the temperature of the mass rose and was controlled by external cooling, so that it is maintained between 95–100° C. until the viscosity thereof at 25° C. measured approximately 10,000 cp. At this stage, the addition of the hydrochloric acid was discontinued immediately and also the mass was immediately thinned with a solvent such as methyl ethyl ketone or a mixture of equal parts of toluol and acetone to provide a 50% solution of the organic reaction product of materials (I) and (II) so produced and said organic reaction product is hereinafter known as product 4.

*Example 5*

100 grams of product 1, 80 grams of an aqueous solution of formaldehyde (37% conc.) and 5 grams of a 10% aqueous solution of sodium hydroxide were charged into a glass vessel and mixed together. While being constantly stirred, the mass was heated to and maintained under refluxing conditions of around 70° C. for a period of about 1 hour. Then the mass was dehydrated under vacuum and there was obtained a thick, viscous material hereinafter known as product 5 and consisting essentially of the formaldehyde reaction product of product 1, which finds application as a bonding or binding agent for brake linings, clutch facings, molded products, etc.

*Example 6*

90 grams of hydroxy benzene, material (I), and 300 grams of 2,3,4,5,-bis(Δ²-butenylene)-tetrahydrofurfural, material (II) together with 30 grams of paraformaldehyde were charged into a glass vessel and while being constantly stirred, there was slowly added thereto 10 grams of 47% aqueous solution of fluoboric acid and the mass is constantly stirred while being heated to a temperature of 130° C. and maintained at that temperature until the viscosity of the mass at 25° C. was approximately 10,000 cp. At this stage, the mass was poured into a shallow pan and placed in an oven maintained at 150° C. and allowed to remain therein for a period of approximately 24 hours. At the end of that time, the mass was found to be a substantially hard, dry and infusible material which was comminutable to 40 mesh and is known hereinafter as product 6.

Example 7

100 grams of novolak (produced by reacting 1 mole of hydroxy benzene with 0.7 mole of formaldehyde employing an acidic catalyst to produce such permanently fusible resin), material (I), and 200 grams 2,3,4,5-bis($\Delta^2$-butenylene) - tetrahydrofurfural, material (II), were heated together while there was slowly added thereto 25 grams of a 50% boron trifluoride solution. This mass, while being constantly stirred, was heated to a temperature of 125° C. which temperature was maintained until a sample thereof when cooled to room temperature was a dry brittle button. The mass was then cooled to room temperature and was found to be a substantially dry, solid material capable of being comminuted, consisting essentially of an organic reaction product of material (I) and (II) known hereinafter as product 7 and finding application in the art of brake linings and clutch facings.

Example 8

150 grams of a reaction product produced by reacting 300 grams of cashew nut shell liquid whose viscosity was 1000 cp. at 25° C. with 60 parts of an aqueous solution of formaldehyde (37% conc.) in the presence of 15 grams of oxalic acid at a temperature of 200° F. and maintaining said components at 200° F. for one hour to produce a substantially thermoplastic resin, material (I), and 600 grams of material (IIK–F), together with 60 grams of diethyl sulfate were mixed together and heated to a temperature of 150° C. for a period of 24 hours to obtain a dry, brittle mass consisting essentially of organic reaction product of materials (I) and (II) finding application in the brake lining field.

Example 9

300 grams of cashew nut shell liquid having a viscosity of 500 cp. at 25° C., material (I), and 1000 grams of each of the respective specific materials (II) set forth in Examples A–H were warmed together and there was added thereto 130 grams of a 50% alcoholic aqueous solution of sulphuric acid which was stirred therein. Then the temperature of respective mass was increased to 150° C. and maintained at that temperature for 24 hours to provide a large number of substantially solid products consisting essentially of organic reaction product of materials (I) and respective material (II) which may be comminuted and employed in such form as friction augmenting particles in friction elements.

Example 10

94 parts of hydroxybenzene (1 mole), 126 parts of material (IIK–A) (0.3 mole) and 220 parts of xylene were charged into a reaction vessel and while being constantly stirred, were heated to a temperature of 150° C. and maintained at that temperature for 13.5 hours. The course of the reaction was followed by azeotropic distillation and measurement of the water split out in the reaction at a pot temperature of 145–150° C. At the end of that period, half of the contents of said reaction vessel was removed therefrom and was analyzed and found to contain 37% of theoretical of complete reaction. The remaining half of material in the reaction vessel was maintained at said temperature for an additional 2½ hours and at the end of that period was found to be 40.5% of complete reaction. Both halves of said mass were mixed together and together represent a product hereinafter known as product 10 in xylene. The xylene was removed therefrom by vacuum distillation, leaving behind product 10. To such product 10 there may be added 20 parts of hexamethylene tetramine for each 100 parts, all by weight, of said product 10 and the components may be mixed together and thereafter, said mixture was heated to and maintained at about 325° F. for 24 hours in shallow pans. At the end of that period, the mass was found to be converted into a substantially solid and infusible state and was comminuted into a fine powder or dust, finding utility as friction particles or friction augmenting materials in friction elements such as brake linings and clutch facings. Said powdery material is hereinafter known as product 10-dust.

Example 11

Employing the same procedure and components and all of those set forth in Example 10 except that, in addition, 2.2 parts of anhydrous sodium acetate was also charged into the reacting vessel and served as an alkaline catalyst for the promotion of reaction between the hydroxybenzene and material (IIK–A) employed. After thirteen hours, 50% of complete reaction had occurred to provide novel product 11 in xylene which may be removed therefrom and, if desired, the mass may be reacted with paraformaldehyde or hexamethylene tetramine (formaldehyde donor) to provide an infusible resin.

Example 12

Employing the same procedure and components as those set forth in Example 10 except that in addition, 4.4 parts of anhydrous potassium carbonate was also charged into the reaction vessel and served as an alkaline catalyst for the promotion of reaction between the hydroxy benzene and material (IIK–C) employed. After 13 hours, 100% of complete reaction had occurred.

Example 13

94 parts of hydroxy benzene (1 mole), 257 parts of material (IIK–A) (0.6 mole), 351 parts xylene and 6.17 parts of oxalic acid dehydrate were all charged into a reaction vessel as in Example 11 and while being constantly stirred as in Examples 11–12, the mix was maintained at 150° C. but for only 7 hours in this instance. At the end of that period, it was found that 46.3% of complete reaction had occurred and the mass, as in Example 11, consisted of a combination of hydroxy benzene-material (IIK–A) organic reaction product together with unreacted hydroxy benzene and material (IIK–A). This organic mass apart from xylene, is known as product 13 which, as in Example 11, may be reacted with hexamethylene tetramine by adding thereto about 7.5% of its weight of hexamethylene tetramine and 2% of its weight of carcium hydroxide and treating such mixture in the manner set forth in Example 11 to provide solid and substantially infusible dusts finding the same application as the dust in Example 11. A 2-gram sample of such dust was measured for acetone extractables and after 2 hours in a Soxhlet extractor, was found to be 3.67%, indicating complete reaction.

Example 14

188 parts of hydroxy benzene (2 moles), 560 parts of material (IIK–A) (1.33 moles), 748 parts xylene and 17.7 parts of an 85% aqueous solution of phosphoric acid were charged into a reaction vessel as in Example 11, and maintained at 150° C. as in Example 11. At the end of 13 hours, the reaction was 83% complete but was allowed to continue for an additional 10 hours when it was found to have been about 99% complete. After vacuum distillation of the xylene, the product which was substantially completely phenol-material (IIK–A) reaction product, is hereinafter known as product 14 and was found to be a hard, brittle solid melting at approximately 53.5° C. This product is also capable of being reacted with 10% of its weight of hexamethylene tetramine as set forth in Example 11 and otherwise treated as set forth therein to provide substantially solid and infusible dusts, serving the same purposes as the dust in Example 11. If desired, such product 14 may be polymerized to raise its melting point to approximately 76° C. by employing cresol sulphonic acid in an amount equal to about 1% of the weight thereof in a mixture therewith and such mixture being maintained at 300° F.

*Example 15*

226 parts of product (II–I–a1) of Example I, 75 parts of hydroxy benzene and 6 parts of paratoluene sulphonic acid were mixed together in a reaction vessel under a reflux condenser. The mixture was heated to and maintained at 100° C. for about 12 hours, whereupon the initial fluidity of greater than 32 cm. flow at 130° F. on a fluidmeter in 1 minute was reduced to 15.5 cm. flow at 130° F. in 1 minute. The source of heat was removed, the mass was allowed to cool to room temperature and at that temperature was found to be a reaction product of hydroxy benzene and product (II–I–a1), hereinafter known as product 15 and was found to be solid having a melting point of about 56° C. This product 15 also is capable of being reacted with hexamethylene tetramine as set forth in Example 11 and may also otherwise be treated in the manner set forth in Example 11 to provide a substantially infusible dust finding the same application as the dust of Example 11.

*Example 16*

300 parts of product (II–J–a1) of Example J, 100 parts of hydroxy benzene and 8 parts of paratoluene sulphonic acid were charged into a reaction vessel. These three components were heated together and mixed and such melt of these components had a fluidity greater than 32 cm. in 1 minute at 130° F. on a fluidmeter. The mass was heated to 100° C. and while being constantly stirred, it was maintained at that temperature for approximately 13 hours, whereupon the fluidity had decreased to 20.5 cm. in 1 minutes at 130° F. on said fluidmeter. The mass was allowed to cool to room temperature and is known hereinafter as product 16 which is capable of being reacted with hexamethylene tetramine in the manner set forth in Example 11 and may be otherwise treated as therein to provide substantially solid, infusible dusts finding the same application as the dust in said Example 11.

*Example 17*

94 parts of hydroxybenzene (1 mole), 54.5 parts of formaldehyde (.67 mole) (37% conc.) and 1.5 parts of paratoluene sulphonic acid were mixed together and heated for 5 hours at 100° C. for substantially complete reaction. The mass was subjected to vacuo to remove the water, leaving behind a phenol-novolak resin.

346 parts of product (II–I–a1) were added to the entire mass of phenol-novolak; the mixture was stirred and its fluidity was measured and found to be 28.5 cm. in 1 minute at 130° F. on a fluidmeter. The mixture was heated to 100° C. and maintained at that temperature for 4 hours, whereupon the fluidity dropped to 15 cm. in 1 minute at 130° F. on said fluidmeter. At the end of said 4 hour period, the mass was cooled to room temperature and found to be a novel reaction product, solid at room temperature and is hereinafter known as product 17 melting at about 62° C. Such product 17 together with about 25% by weight thereof of hexamethylene tetramine may be mixed together and when maintained at about 325° C. for 24 hours, will be converted to a substantially solid and infusible state and thereafter may be ground to a fine powder or dust and may be employed in brake linings and clutch facings as friction augmenting materials.

*Example 18*

300 parts of treated cashew nut shell liquid prepared in the manner set forth in U.S. Patent 2,559,593 to S. Caplan, issued July 10, 1951, and having a viscosity of 184 cp. at 25° C. (Example 4 of said patent), 284 parts of material (IIK–A), 580 parts of xylene and 11.3 parts of potassium carbonate were added in the above order to a reaction vessel equipped with a stirrer, azeotropic water trap and condenser. While being constantly stirred, the mixture was heated to and maintained at about 135–145° C. for about 24 hours whereupon substantially complete reaction occurred. The mass was then subjected to distillation under vacuum, whereupon the solvent was removed leaving behind a resinous reaction product having a fluidity of 7.5 cm. in 1 minute at 130° F. on a fluidmeter. A small sample was neutralized with sulphuric acid (dilute) and heated with boron trifluoride phenol complex (1% $BF_3$ based on resin), heated at 80° C. until a fluidity of 2.5 cm. at 130° F. in 1 minute on a fluidmeter was achieved. After mixing in 5 parts of powdered paraformaldehyde to 100 parts of resin, the mix was heated for 16 hours at 100° C. followed by heating for 4 hours at 180° C. yielding a thermoset, infusible mass. A powdery sample had an acetone extract of 17.15%.

*Example 19*

300 parts of treated cashew nut shell liquid having a viscosity of 100 cp. at 25° C. (Example 1 of Caplan Patent No. 2,559,593), 15 parts of formaldehyde, 20 parts of ammonium hydroxide were mixed together and held at 100° C. for 3½ hours at which point the odor of formaldehyde had disappeared. To this cashew nut shell liquid-formaldehyde reaction product was added 140 parts of product (II–J–a1) and 4 parts of paratoluene sulphonic acid. The initial fluidity after mixing was measured for 1 minute at 130° F. or a fluidmeter. After the mass had been heated for 1 hour at 100° C. a like measurement was taken and was found to be approximately one-half the first. The resultant product was a thick resinous copolymeric reaction product of the two reactable components and is hereinafter known as product 19.

*Example 20*

120 parts of a liquid residue of cashew nut shell liquid (according to S. Caplan Patent No. 2,559,594), 40 parts of material (IIK–A), 8 parts of diethyl sulphate and 5 parts of paraformaldehyde are heated together at 100° C. until a viscous intermediate product is formed. This intermediate product, known hereinafter as product 20 intermediate, can be mixed into asbestos and other fillers in the making of brake linings and clutch facings and can be incorporated into rubber to increase oil resistance. And this intermediate product can be further cured, for example, at about 150° C. for 16 hours to obtain an infusible mass which can be pulverized. The pulverized product, for example, at 20 to 40 mesh, can be used for friction fortifying material in brake linings and clutch facings. Product 20 may also be ground to a fine powder and used as a brake lining binder alone or with hexamethylene tetramine and lime. It may be used with phenol-aldehyde resins for further heating to an infusible mass. Each and all of these compounds can be used as friction fortifying materials.

*Example 21*

A great variety of other novel reaction products may be produced by substituting for the hydroxybenzene, the corresponding molecular amounts of other phenols and especially cashew nut shell liquid, cardanol or cardol in either the monomeric or polymeric condition.

All of said products 1–19 may also be reacted with formaldehyde, paraformaldehyde, furfural, etc., preferably in the presence of an acidic catalyst and heat converted to the infusible state. For such purpose, 100 parts of products 1–19 respectively, 10–15 parts of paraformaldehyde and 10 parts of diethyl sulphate are mixed together and the mix held at 300° F. for 24 hours.

Products 1, 2, 4, 5 and 13–20 may also be dissolved in various organic solvents such as methyl ethyl ketone or toluol and acetone or a solvent consisting of 50% xylene and 50% butanol, or they may be emulsified with soap-water carrier and employed as an insecticidal spray. As a matter of fact, all of the reaction products of this invention which are soluble or dispersible in any carrier whether it be a ketone, kerosene, water or other agent, may be employed as an insecticidal spray. In addition, all of the reaction products of this invention may be combined with pyrethrum, rotenone, DDT or other insectional compositions and act synergistically therewith. In addition, all of the organic reaction products of this invention, examples of which have hereinbefore set forth, may be employed as components of frictional elements such as brake linings, clutch facings, etc. These, such as product 3 for example, when in the comminuted condition, may be employed as friction fortifying augmenting particles while others may with the aid of others, such as products 1, 2, 4 and 5, be combined with the components of the friction element to be produced together with an aldehyde or aldehyde donor for reaction to produce a high heat resistant binder.

For example, approximately 25–30 parts of product 2, 65–70 parts of asbestos, together with fillers such as barytes and 5 parts of hexamethylene tetramine may be mixed together to uniformity, then formed into strips by extrusion. The extruded pieces are dried and cured under pressure at temperatures up to 400° F. to provide a tough hard mass finding application as clutch facings and brake linings and in which product 2 has been reacted with the aldehyde from the hexamethylene tetramine to provide a substantially solid highly resistant resinous binder. Instead of using product 2 in the production of said brake linings, products 1, 2, 4, 5 and 13–19, for example, may have been substituted therefor and instead of using hexamethylene tetramine, other aldehyde donors or aldehydes themselves may have been used; and where formaldehyde or paraformaldehyde has been employed in any of the examples herein, other aldehydes may be substituted wholly or in part therefor and examples of them are well known to the art and are furfural, trioxane, glyoxal, etc.

All of the novel products of this invention, examples of which are the various products of Examples 1 et seq. are useful as components in friction elements and brake linings. All of such products which are not infusible may be rendered infusible by polymerizing them in the presence of a catalyst such as paratoluene sulfonic acid, diethyl sulphate, etc., or by reaction with an aldehyde, such as formaldehyde, furfural, paraformaldehyde, etc. in the presence of a catalyst which is preferably acidic, or with an aldehyde donor such as hexamethylene tetramine. For example, all of them may be mixed with hexamethylene tetramine in amount equal to about 20–35% by weight thereof and such mixture maintained at 300–350° F. for 24 hours. The resultant infusible mass may be comminuted into a fine powder or dust and such dusts employed as friction fortifying materials. Because of the low cost of said materials (II) used in the production of said reaction products, said dusts are relatively inexpensive.

All of such novel products of this invention which are not infusible may be dissolved in a solvent, such as one consisting of equal weights of xylene and butanol. Into such a solution is added asbestos flock, barytes, hexamethylene tetramine as well as other normal components for the type of brake lining desired. The mass is thoroughly mixed, extruded, shaped, solvent driven off and cured under pressure at temperatures up to 350° F. for 24 hours to provide brake linings.

When the novel products of this invention are to be employed in the field of brake lining and clutch facings, we prefer that the phenol employed have a viscosity no greater than about 1500 centipoises at 25° C. and be selected from the group consisting of one or a combination of monomeric and polymeric cashew nut shell liquid, cardanol, cardol and residues of cashew nut shell liquid and that the material (II) employed have a softening point (ball and ring) no greater than about 100° F. in order to obtain reaction products which when, by polymerization or aldehyde reaction, are converted to the infusible state to provide products having good heat resistance and good frictional properties.

It is also within the purview of this invention to employ any and all of the organic reaction products disclosed herein as coating materials, and when such materials are to be used as coating or impregnating components, those which are liquid at the temperatures of application or not capable of being dissolved in organic solvent as those hereinbefore mentioned are preferably used for such purposes and when so used they also may be combined with an aldehyde or aldehyde donor and after application, the impregnated or coated material may be heated to a temperature sufficient to cause reaction between such material (II) or aldehyde or donor to convert the same to the substantially solid and, if desired, infusible state.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

This application is a continuation-in-part of our copending application Serial No. 680,911 of August 29, 1957, now abandoned, which in turn is a continuation in part of our application Serial No. 338,876, filed February 25, 1953, and now being Patent No. 2,816,286.

Having thus described the invention what we claim is:

1. An organic reaction product produced by heat reacting (I) a material selected from the group consisting of (a) aldehyde reactive phenols and (b) phenol-aldehyde reaction products liquid at 250° F. and (II) material selected from the group consisting of (c) organic residues produced and obtained as by-products in the furfural extractive distillation method for the purification of butadiene and containing butadiene-furfural reaction product, (d) homopolymers of said respective residues, (e) residual fractions of said respective residues, each of said fractions produced by maintaining a mass of the residue at elevated temperature no greater than 450° F. until a residual fraction thereof is obtained whose weight measures at least 60% by weight of said mass, (f) homopolymers of said respective residual fractions, and (g) aldehyde reaction products of said respective residues, said respective homopolymers of said respective residues, said respective residual fractions and said respective homopolymers of said respective residual fractions, each of the respective materials (c)–(f) having an average molecular weight of at least 330, viscosity of at least 2000 centipoises at 25° C. and a softening point (ball and ring) of at least 60° F. and no greater than 180° F.

2. An organic reaction product produced by heat reacting (III) and aldehyde and (A) an organic reaction product defined in claim 1.

3. An organic reaction product produced by heat reacting (I) cashew nut shell liquid having a viscosity no greater than 1500 cp. at 25° C. and (II) organic plant residue produced and obtained as by-product in the furfural extractive distillation method for the purification of butadiene and containing butadiene-furfural reaction product, said (II) having average molecular weight of at least 330, viscosity of at least 2000 centipoises at 25° C. and a softening point (ball and ring) of at least 60° F. and no greater than 100° F.

4. An organic reaction product produced by heat reacting (III) and aldehyde and (A) an organic reaction product defined in claim 3.

5. A friction element comprising asbestos and a reaction product defined in claim 1 but converted to the infusible state.

6. A friction element comprising asbestos and a reaction product defined in claim 4 converted to the infusible state.

References Cited in the file of this patent

UNITED STATES PATENTS

| | | |
|---|---|---|
| 2,461,508 | Harvey | Feb. 15, 1949 |
| 2,483,903 | Herbolsheimer | Oct. 4, 1949 |
| 2,683,151 | Hillyer et al. | July 6, 1954 |
| 2,816,286 | Harvey et al. | Dec. 10, 1957 |